Patented Nov. 25, 1941

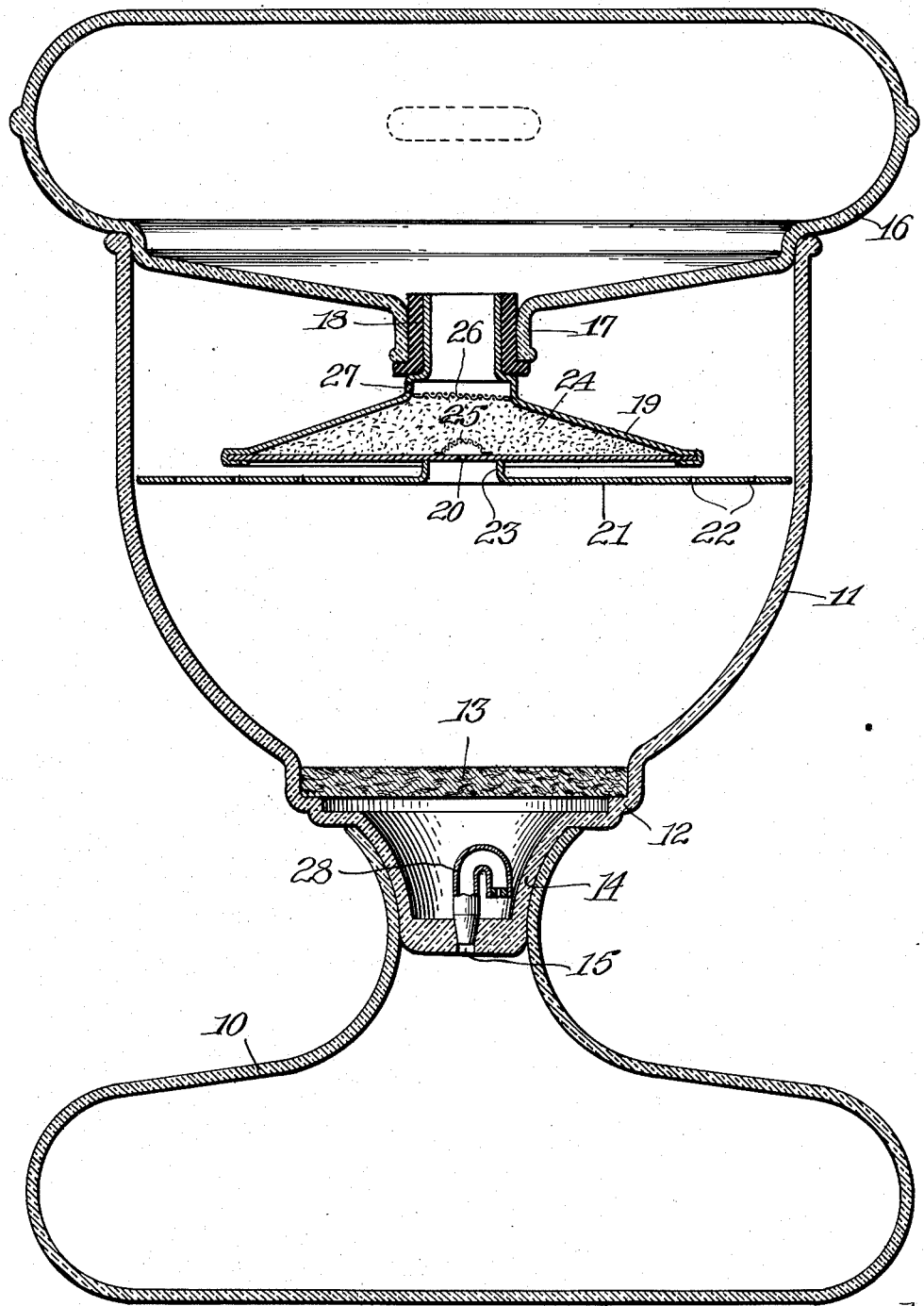

2,263,610

UNITED STATES PATENT OFFICE 2,263,610

METHOD FOR MAKING COFFEE EXTRACT

Gordon H. Cain, Chicago, Ill., assignor to Ca-Bru Corporation, Chicago, Ill., a corporation of Illinois Application April 29, 1939, Serial No. 270,895

3 Claims. (Cl. 99—71)

This invention relates to a method and apparatus for making a coffee extract from which a coffee beverage is made by the addition of either cold or hot water. This application constitutes a continuation in part of my co-pending application, Serial No. 124,476 for Method and apparatus for making coffee.

An object of the invention is to provide a method and apparatus for making a coffee extract from which a coffee beverage is made by the addition of either hot or cold water which will impart a coffee flavor more closely resembling the aroma given off from freshly roasted coffee and the aroma of brewing coffee. A further object is to provide means whereby air is substantially eliminated from the coffee bed before the coffee grounds become sufficiently moistened to serve as means for retaining the air. A further object is to provide means whereby water is introduced mainly from the bottom portion of the ground chamber whereby the air is freed through the coffee grounds and is not trapped as the ground chamber is filled. A further object is to provide a method and apparatus whereby the true coffee flavor can be extracted without being deleteriously affected by air and through a balanced time arrangement permitting the absorption of the true coffee aroma without dissolving the bitter and disagreeable substance of the grounds. Other specific objects and advantages will appear as the specification proceeds.

The invention is illustrated, in a preferred embodiment, by the accompanying drawing which consists of a vertical sectional view.

In the illustration given, 10 designates a receptacle for the extract after it has been formed by passing water through the grounds. The grounds are supported within a second receptacle 11, equipped with a flange 12 for supporting a filter 13. The container 11 is provided with a depending neck portion 14 received within the upper neck of receptacle 10. The portion 14 is provided with a drip passage 15 through which the extract passes into the container 10.

Water is supported within a top container 16 provided with an inwardly and downwardly extending funnel portion 17. Within the funnel portion 17 is placed a rubber seal 18 which supports a metal drip vessel 19. The vessel 19 is provided with a central perforation or opening 20 through which water drips into the center portion of the grounds. A disk member 21, provided with perforations 22, is adapted to be placed over the grounds. It is provided with an opening 23 at its center through which the water passes from opening 20.

The various parts of the apparatus described may all be made of metal, glass or other suitable material. It will be understood that such materials will be varied by the manufacturer according to specific uses desired.

Referring more specifically to the drip receptacle or filter member 19, the main body thereof is filled, as shown, with a filter media, such as activated carbon 24, or the like. I prefer to employ an inverted screen cone 25 over the drip opening 20, and at the bottom of the neck portion of the member 19 I prefer to employ another screen 26. In order to permit water to flow through the opening 20, I provide an opening 27 at the bottom of the neck of member 19 which permits air to pass into container 16, thereby breaking the vacuum and permitting the water to flow through opening 20.

A siphon member 28 is provided in the depending neck portion 14 and communicates with the drip passage 15. The siphon may be lifted out of its friction fit joint and cleaned separately.

Broadly, the operation consists in filling the bowl member 11 with coffee grounds above the felt member 13 with the disk 21 resting thereon. The member 16, with the suspended filter drip member 19, is placed in position and water caused to pass through the filter 24. The water passes through the small opening 20 and passes down through the small central area of the coffee grounds so that it does not moisten the grounds except in the small central area. The water then builds up from the bottom and gradually pushes the air out of the grounds as it rises until the air is substantially eliminated and before the grounds become moistened to the extent that they occlude or hold air. The finished extract passes through the filter 13 and thence through opening 15 into the extract bowl 10.

In the process and apparatus described, the extract is made by properly regulating the flow of a definite amount of cold water through a proportionate bed of roasted ground coffee. The entrance of the water into the coffee bed and its release therefrom is so synchronized as to entirely relieve the ground coffee of all choice flavor-producing elements on its passage through the coffee bed.

All the parts of the roasted coffee which contribute to the delightful taste of coffee beverage are soluble in cold water and these parts are removed with this method of properly regulated admittance and release of cold water into and from a bed of roasted ground coffee over a proper time period.

During the roasting process of the coffee beans, part of the fixed coffee oils and other parts are carbonized, thus forming a gas which contains the aromatic coffee oil or flavor. This gas is distributed throughout the entire structure of the coffee bean and exists there under considerable pressure. The amount of true coffee flavor imparted to a beverage is entirely dependent upon the amount of aromatic oil contained in the coffee itself. Due to the great gas pressure contained within the coffee bean structure, there is a great loss of aromatic oil experienced during the grinding process. This loss is directly in accordance with the fineness of grind. The finer the coffee is ground, the greater is the loss of gas and aromatic oil. Therefore, coffee of medium or average grind contains more flavor-producing elements than does fine grind or powdered coffee. As roasted ground coffee is subject to rapid flavor loss when exposed to air, it is important to convert the ground coffee into extract as soon as possible after grinding or in the case of vacuum packed coffee as soon as possible after the container has been opened.

The filter pad 13 prevents the outlet from the coffee ground chamber from becoming clogged with coffee particles, and it also serves to filter the extract as it leaves the coffee bed in order to free the extract from sediment and coffee particles which would affect the stability of the extract.

The water container and drip chamber provide a filtering means whereby chlorine, sulphur, and other undesirable materials are removed from the water before it contacts the ground coffee, thus preventing the action of these chemicals upon the coffee and preventing the distortion of the coffee flavor. The water container may be filled with cold water and placed on top of the coffee container. The flow therefrom into the bed of coffee is so regulated as to enter the bed at a rate sufficiently slow to allow the water to accumulate at the bottom of the coffee bed and rise slowly in the coffee chamber until the entire coffee is covered with water. By this method, the coffee particles are softened, thereby allowing the gas to escape and rise through the water, permitting the water to absorb the aromatic oil from the gas. As the gas is released from the coffee particles, the water replaces the empty gas cells which further dissolves the desirable water-soluble parts of the ground coffee. By the proper release of the saturated water from the bed of ground coffee, the fresh water from the top of the coffee bed slowly gravitates through the coffee bed, continuing its absorption of the water-soluble parts. Thus the ground coffee is constantly being contacted by fresh water to free the coffee bed of the flavor-producing elements.

I have found that best results are experienced when the flow of water into the coffee bed is so regulated as to allow at least thirty minutes for the entire coffee bed to become completely covered with water. This allows ample time for the free air to escape from between the coffee particles and which, if not expelled, would prevent proper water contact with the ground coffee. The release of extract from the coffee container is so regulated as to require a period of from eight to twelve hours for a complete extraction. This time is necessary to properly soak the ground coffee so that the desirable water-soluble elements will be dissolved by the subsequent flow of the water through the coffee bed. The proper regulation of the flow of the cold water into the bed of ground coffee, the duration of time the water is permitted to contact the coffee, and the rate of flow of the extract from the coffee bed, are important factors in determining both the flavor and concentration of the extract.

After the extraction, as described, it is found that there are substantially no further flavor-producing elements left behind after the first extraction, and further extraction would cause the coffee grounds to give up undesirable elements which would distort the true coffee flavor.

Considerable variation is noticeable in the flavor of extract by varying the proportions of water used per pound of ground coffee as well as the duration of time required for the extraction. The most desirable extract is produced by using approximately sixty fluid ounces of water to each pound of coffee and by regulating the release of the extract from the coffee bed so that approximately three-fourths of the volume of the extract is released in about eight hours and the remaining one-fourth in about four hours.

The extract yield over a period of twelve hours should be approximately forty fluid ounces which is sufficiently concentrated to produce an average strong coffee beverage by the use of one fluid ounce of the extract to form an average size cup of beverage.

In the process described, it will be noted that the dripping of the water through a single centrally located opening in the drip chamber enables it to pass to the bottom of the container without moistening but a tiny portion of the grounds, and as it builds up, it forces the air from the coffee grounds before they become moistened and softened. The rising water is thus free to reach all exposed parts of the coffee grounds so as to release the gas therefrom without its contacting the air. If the water were allowed to drip generally upon the coffee grounds so as to moisten the bed rather uniformly, it is found that the air is trapped, that it prevents the water from reaching portions of the grounds, contaminates and affects the aroma held in the gases, and prevents the beneficial results obtained through the method described, namely of introducing the water mainly from the bottom, the only portion wetted being a central localized portion.

While in the foregoing description, I have set forth certain specific conditions, it will be understood that these may be varied widely without departing from the spirit of my invention. I wish it to be understood that I do not desire to be limited to the exact details of construction shown and described, for obvious modifications will occur to a person skilled in the art.

I claim:

1. In a process for making a coffee extract in a single pass of unheated water through ground coffee, the steps of confining coffee grounds in a body, dripping the water upon a localized area of said grounds while preventing the outflow of water from the bottom of the grounds sufficiently to cause a rising level of water in said grounds to provide a body of clear water above the grounds, allowing the unheated water to remain in contact with the grounds for a sufficient period of time to produce a concentrated coffee extract while slowly withdrawing extract from the bottom of the grounds to feed constantly fresh portions of water about the individual grounds.

2. In a process for making a coffee extract in a single pass of unheated water through ground coffee, the steps of confining coffee grounds in a body at atmospheric pressure, dripping the water upon a localized area of said grounds while preventing the outflow of water from the bottom of the grounds sufficiently to cause a rising level of water in said grounds to build up a body of clear water about the grounds, allowing the unheated water to remain in contact with the grounds for a period of from eight to twelve hours while slowly withdrawing extract from the bottom of the grounds to feed fresh portions of water about the individual grounds.

3. In a process for making a coffee extract in a single pass of unheated water through ground coffee, the steps of confining coffee grounds in a body, dripping water into a localized area of said grounds while preventing the outflow of water from the bottom of the grounds sufficiently to cause a rising level of water in said grounds, continuing the inflow of water to form a body of clear water over the grounds, allowing the unheated water to remain in contact with the grounds for a sufficient period of time to produce a concentrated coffee extract, while slowly withdrawing extract from the bottom of the grounds so as to feed fresh portions of water about the individual grounds.

GORDON H. CAIN.